United States Patent
Chikiri et al.

(10) Patent No.: US 6,227,522 B1
(45) Date of Patent: May 8, 2001

(54) METHOD AND IMPLEMENT FOR INSTALLATION OF SPIRAL HANGERS FOR A CABLE

(75) Inventors: Kazuyoshi Chikiri, Fukuchiyama; Yukikiro Higashi, Sakai, both of (JP)

(73) Assignee: Hien Electric Industries, Ltd., Osaka (JP)

( * ) Notice: Subject to any disclaimer, the term of this patent is extended or adjusted under 35 U.S.C. 154(b) by 0 days.

(21) Appl. No.: 09/345,803

(22) Filed: Jul. 2, 1999

Related U.S. Application Data

(62) Division of application No. 09/003,823, filed on Jan. 7, 1998, now Pat. No. 5,979,880.

(30) Foreign Application Priority Data

Mar. 31, 1997 (JP) .................................................. 9-94483
Jun. 6, 1997 (JP) .................................................. 9-163558

(51) Int. Cl.[7] .................................................. E21C 29/16
(52) U.S. Cl. .................................. 254/134.3 R; 254/134.3 CL
(58) Field of Search .................. 254/134.3 R, 134.3 CL, 254/134.3 PA; 269/46; 29/433, 241

(56) References Cited

U.S. PATENT DOCUMENTS

| | | |
|---|---|---|
| 2,744,707 | 5/1956 | Peterson . |
| 3,185,443 | 5/1965 | Eitel . |
| 3,185,444 | 5/1965 | Eitel . |
| 3,814,383 | 6/1974 | Jackson . |
| 4,019,715 | 4/1977 | Vugrek . |
| 4,191,334 | 3/1980 | Bulanda et al. . |
| 5,040,771 | 8/1991 | Spell . |
| 5,727,777 | * 3/1998 | Chikiri et al. .............. 254/134.3 CL |

* cited by examiner

Primary Examiner—Robert C. Watson
(74) Attorney, Agent, or Firm—Armstrong, Westerman, Hattori, McLeland & Naughton

(57) ABSTRACT

There is disclosed a method of installing spiral hangers for hanging a cable on a messenger wire installed between a pair of electric utility poles. One end of a spiral hanger is first movably attached to the messenger wire in the vicinity of one of the electric utility poles. The spiral hanger has an inner diameter greater than the sum of the outer diameter of the messenger wire and the outer diameter of the cable. Subsequently, the spiral hanger is transported toward the other of the electric utility poles, and the other end of the spiral hanger is joined to one end of a succeeding spiral hanger through use of a joint sleeve. Above-described operations are repeated, and the spiral hangers are fixed to the messenger wire through use of fixing devices when the first spiral hanger arrives at the other of the electric utility poles. Subsequently, a cable is passed through the spiral hangers through use of a pull-rope threading implement, whereby the cable is installed by work performed only in the vicinity of the electric utility poles. Special implements are used in order to facilitate the installation of the spiral hangers.

1 Claim, 10 Drawing Sheets

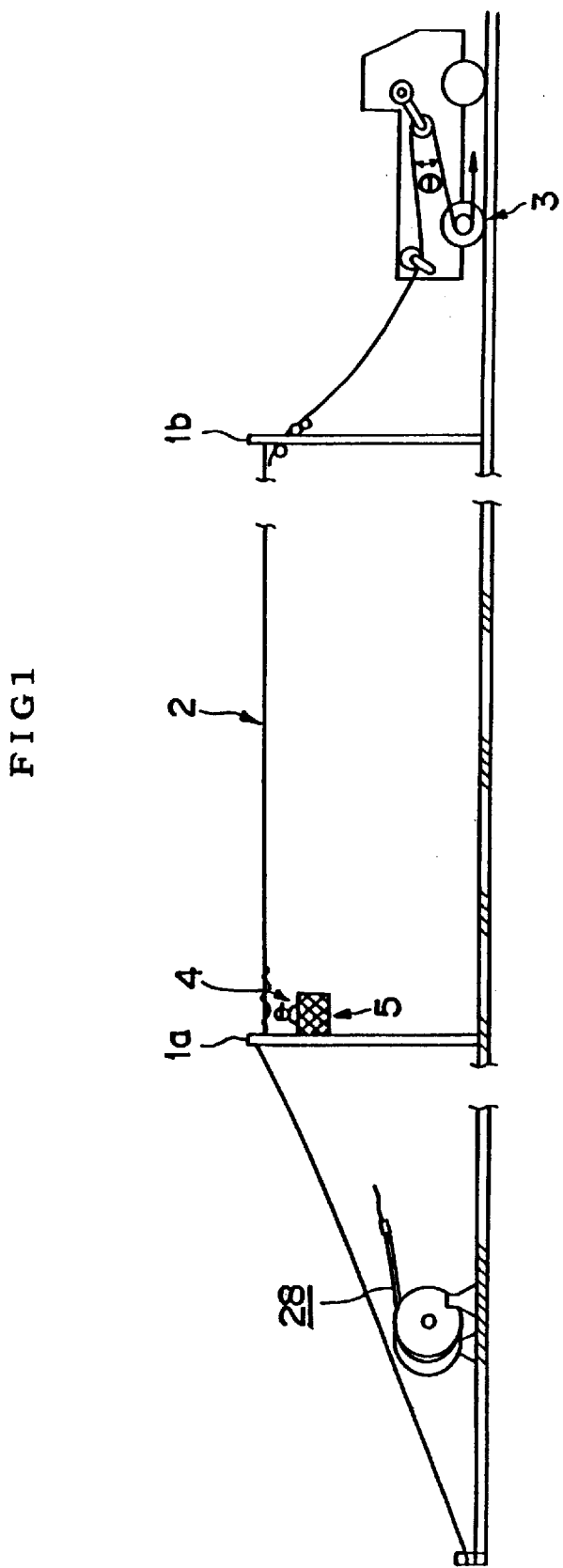

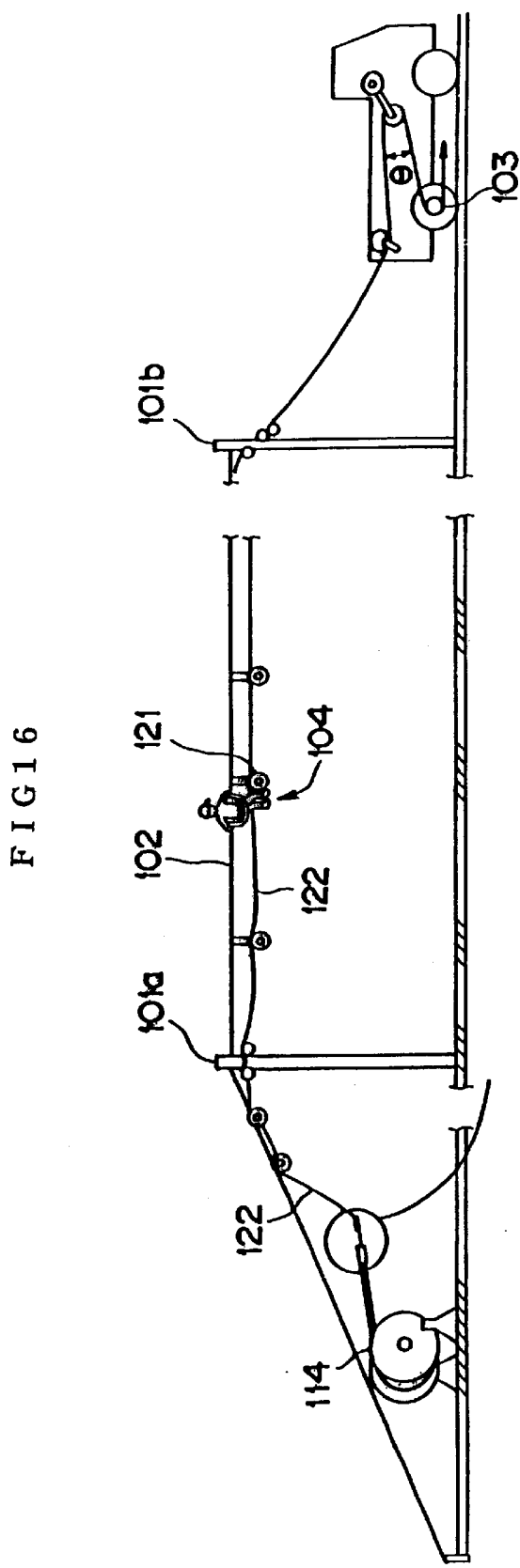

METHOD AND IMPLEMENT FOR INSTALLATION OF SPIRAL HANGERS FOR A CABLE

This application is a divisional application of Ser. No. 09/003,823 filed Jan. 7, 1998 now U.S. Pat. No. 5,979,880.

BACKGROUND OF THE INVENTION

1. Field of the Invention

The present invention relates to a method and implement for installation of spiral hangers for hanging a cable on a messenger wire.

2. Description of Related Art

Conventionally, a hanger system 100 as shown in FIGS. 15 and 16 has been commonly used to hang a cable from a messenger wire and fix the cable thereto. The procedure for installing a cable using such a hanger system will be described with reference to FIG. 15. First, a plurality of pulleys 121 are attached to a messenger wire 102 which has been installed between electric utility poles 101a and 101b. A pull rope 122 is then passed through the pulleys 121 and is connected to a winch 103. The winch 103 is then operated so as to cause a cable 114 connected to the pull rope 122 to run between the electric utility poles 101a and 101b. Subsequently, hangers 106 shown in FIG. 14 are attached to the messenger wire 102 at intervals of 50–60 cm and the pulleys 121 are removed. These operations are performed by a worker 104 who dangles in midair between the electric utility poles 101a and 101b. This is called midair dangling work. Therefore, the worker 104 must have experience, and this work is time consuming and dangerous. Also, an accident has occurred in which a pulley 121 fell down and injured a passer-by. Accordingly, a strong desire exists to solve the above-described problems.

Also, when a cable is supported by use of hangers, there is the possibility that the hangers may fall down or slide sideways due to external causes, with the result that proper support of the cable cannot be maintained and the characteristics of the cable are adversely affected.

SUMMARY OF THE INVENTION

In view of the foregoing problems, an object of the present invention is to provide a method for installation of spiral hangers for hanging a cable which can be performed safely without the need for midair dangling work and which can prevent the hanger from falling down or sliding sideways.

Another object of the present invention is to provide implements for facilitating the installation of spiral hangers as well as for leading a cable into the spiral hangers.

In order to achieve the above object, the present invention provides a method of installing spiral hangers for hanging a cable on a messenger wire installed between a pair of electric utility poles. The method comprises the steps of:

(a) movably attaching one end of a spiral hanger to a messenger wire in the vicinity of one of the electric utility poles, the spiral hanger having an inner diameter greater than the sum of the outer diameter of the messenger wire and the outer diameter of the cable;

(b) transporting the spiral hanger toward the other of the electric utility poles;

(c) joining the other end of the spiral hanger to one end of a succeeding spiral hanger through use of a joint sleeve;

(d) repeating steps (b) and (c);

(e) fixing the spiral hangers to the messenger wire through use of fixing devices when the first spiral hanger arrives at the other of the electric utility poles; and (f) passing a cable through the spiral hangers through use of a pull-rope threading implement.

With this operation, the cable can be installed by work performed only in the vicinity of the electric utility poles.

The present invention also provides an implement set used for installation of spiral hangers for hanging a cable on a messenger wire installed between a pair of electric utility poles.

The implement set comprises:

an introduction/guide implement having a ring portion through which the spiral hangers freely pass and a support portion through which the introduction/guide implement is supported by the messenger wire;

a falling-down-prevention coupling implement to be attached to the forward end of the first spiral hanger and adapted to be coupled with the messenger wire;

a cylindrical introduction guide to be fit onto the messenger wire with a clearance being formed between the messenger wire and the bottom portion of the cylindrical introduction guide; and a pull-rope threading implement for passing the cable through the spiral hangers attached to the messenger wire installed between the electric utility poles.

The present invention also provides an implement used for installation of spiral hangers for hanging a cable. The implement is composed of a feed apparatus which comprises a pair of pinch rollers for sandwiching and feeding a spiral hanger, and a handle for rotating the pinch rollers.

When the method and the implement set according to the present invention are utilized, dangerous midair dangling work becomes unnecessary, and all work can be performed in the vicinity of electric utility poles. Accordingly, the attachment of the spiral hangers serving as cable holders to the messenger wire can be performed safely and easily.

Also, the method according to the present invention can eliminate the work of attaching and detaching jigs such as a pulley to a messenger wire. Therefore, there can be eliminated the possibility of parts falling down and hitting a passer-by.

In the method of the present invention, each of the spiral hangers is fixed to an adjacent joint sleeve by crimping and the spiral hangers are fixed to the messenger wire through use of fixing devices. Accordingly, the spiral hangers are prevented from sliding or falling.

Moreover, when the introduction/guidance implement is used, the installation of the spiral hangers can be performed easily, quickly, and reliably.

When the pull-rope threading implement according to the present invention is utilized, the cable can be led into the inside space of the spiral hanger smoothly and quickly.

When the feed apparatus of the present invention is used, it becomes possible to smoothly feed spiral hangers having a length of 3000 mm and spiral hangers having a length of 5000 mm, as well as spiral hangers having a length of 1000 mm. In addition, the connection and crimping work at joint sleeves can be facilitated.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 is a side view schematically showing an embodiment of a method of installing spiral hanger for hanging a cable according to the present invention;

FIG. 16 is a schematic side view showing an example of installation of a cable in which the conventional hanger system is used.

DETAILED DESCRIPTION OF PREFERRED EMBODIMENT

Figure 2A:
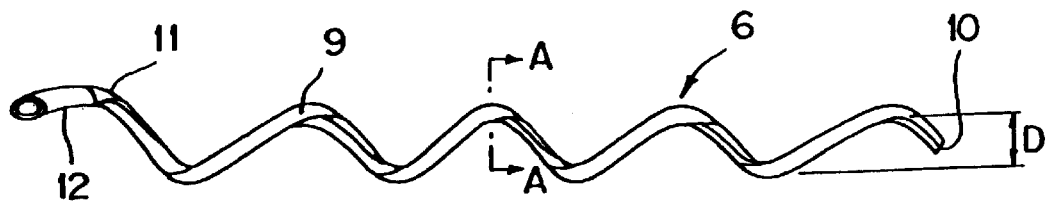
FIG. 2A is a side view of a spiral hanger used in the method of the present invention.

An embodiment according to the present invention will now be described in detail with reference to the accompanying drawings.

As shown in FIG. 1, a messenger wire 2 is previously installed between a pair of electric utility poles 1a and 1b through use of a winch 3. A worker 4 in a bucket 5 disposed in the vicinity (about 1 m) of one electric utility pole 1a performs installation work.

Figure 2B:
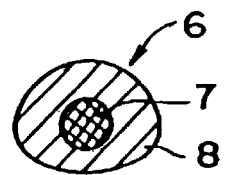
FIG. 2B is a sectional view taken along line A—A in FIG. 2A.
Figure 3:
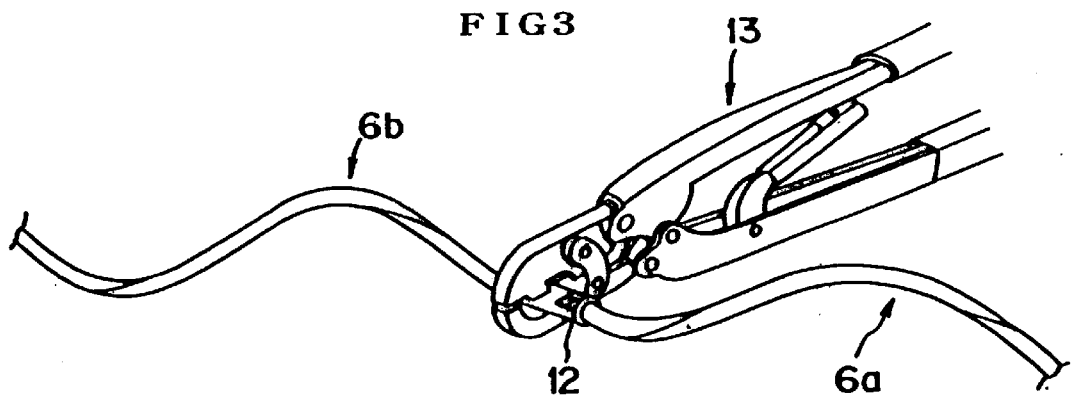
FIG. 3 is a perspective view showing an operation of connecting spiral hangers by using a joint sleeve in the method of the present invention.
Figure 4:
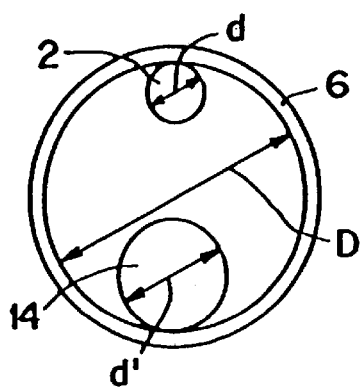
FIG. 4 is a sectional view showing the state in which a cable is hung from a messenger wire using spiral hangers in the installation method of the present invention.

As shown in FIGS. 2A and 2B, a spiral hanger 6 of the present invention includes a core wire 7 and a layer 8 of a synthetic resin material which covers the core wire 7. The spiral hanger 6 is bent in a spiral shape 9 extending in the longitudinal direction, and is cut to a predetermined length of 75 cm or 100 cm. Although nothing is attached to one end 10 of the spiral hanger 6, a joint sleeve 12 is attached to the other end 11 such that the other end 11 is inserted halfway therein. The joint sleeve 12 is crimped by a crimping tool 13 shown in FIG. 3 so as to reduce the time and labor at the construction site. A shown in FIG. 4, the inner spiral diameter D of the spiral hanger 6 is set so as to be greater than the sum of the outer diameter d of the messenger wire 2 and the outer diameter d' of the cable 14, preferably equal to or greater than 200% of the sum.

Figure 5A:
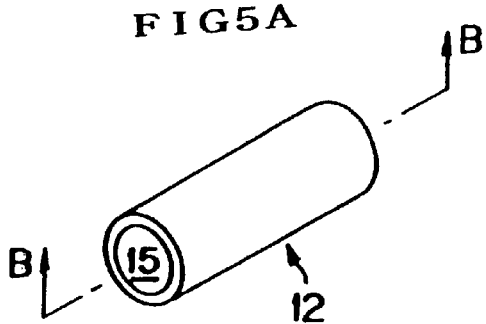
FIG. 5A is a perspective view of a joint sleeve used in the installation method of the present invention.
Figure 5B:
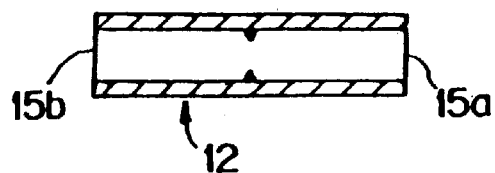
FIG. 5B is a sectional view taken along line B—B in FIG. 5A.

The joint sleeve 12 used in the installation method according to the present invention has a shape as shown in FIGS. 5A and 5B and is made of metal. In the present embodiment, aluminum is used. A through hole 15 is longitudinally formed in the joint sleeve 12. The through hole 15 has a cross section corresponding to the cross section of the spiral hanger 6 shown in FIG. 2A. In the present embodiment, the through hole 15 is straight and is crimped onto the spiral hanger 6 shown in FIG. 2A such that the other end 11 of the spiral hanger 6 is inserted halfway into the through hole 15.

Figure 6:
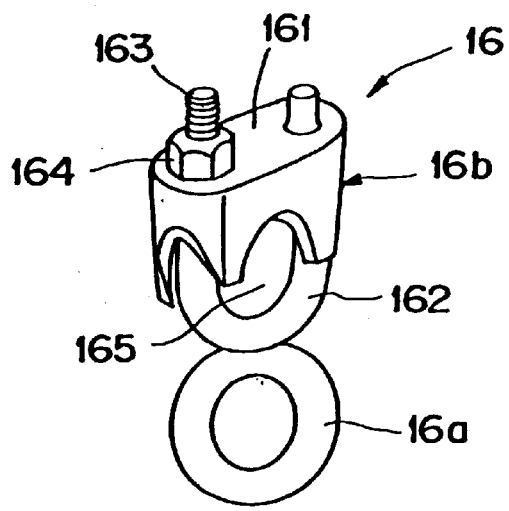
FIG. 6 is a perspective view of an introduction/guidance implement used in the installation method of the present invention.
Figure 7:
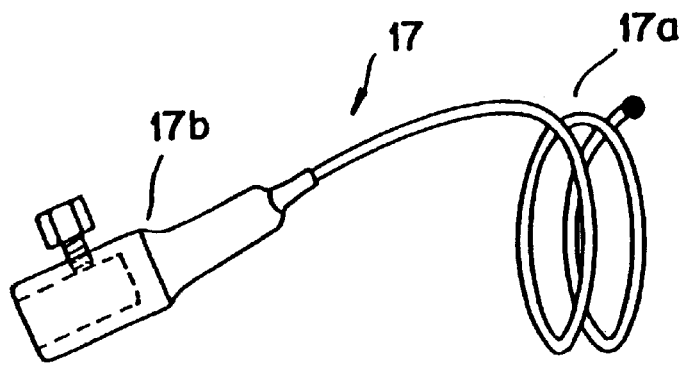
FIG. 7 is a front view of a falling-down-prevention coupling implement for coupling the spiral hanger with the messenger wire.
Figure 8:
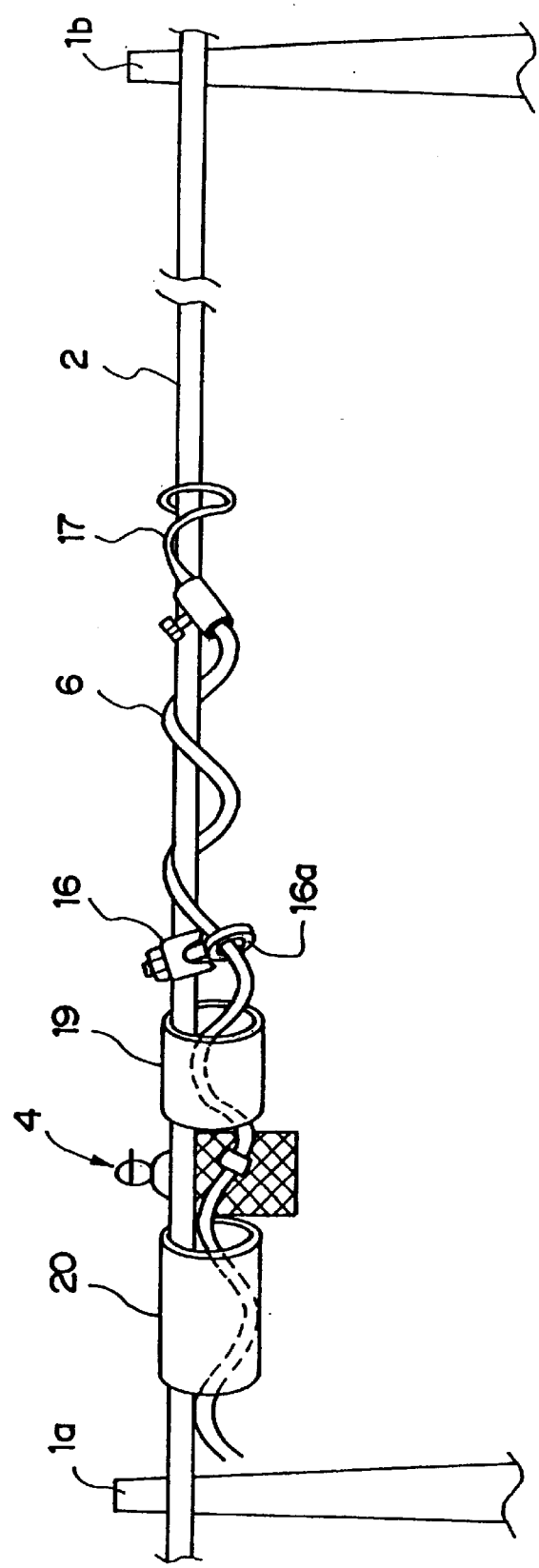
FIG. 8 is a side view showing an embodiment in which the introduction/guidance implement and a feed apparatus are used when the spiral hangers are attached to the messenger wire in accordance with the installation method of the present invention.
Figure 9:
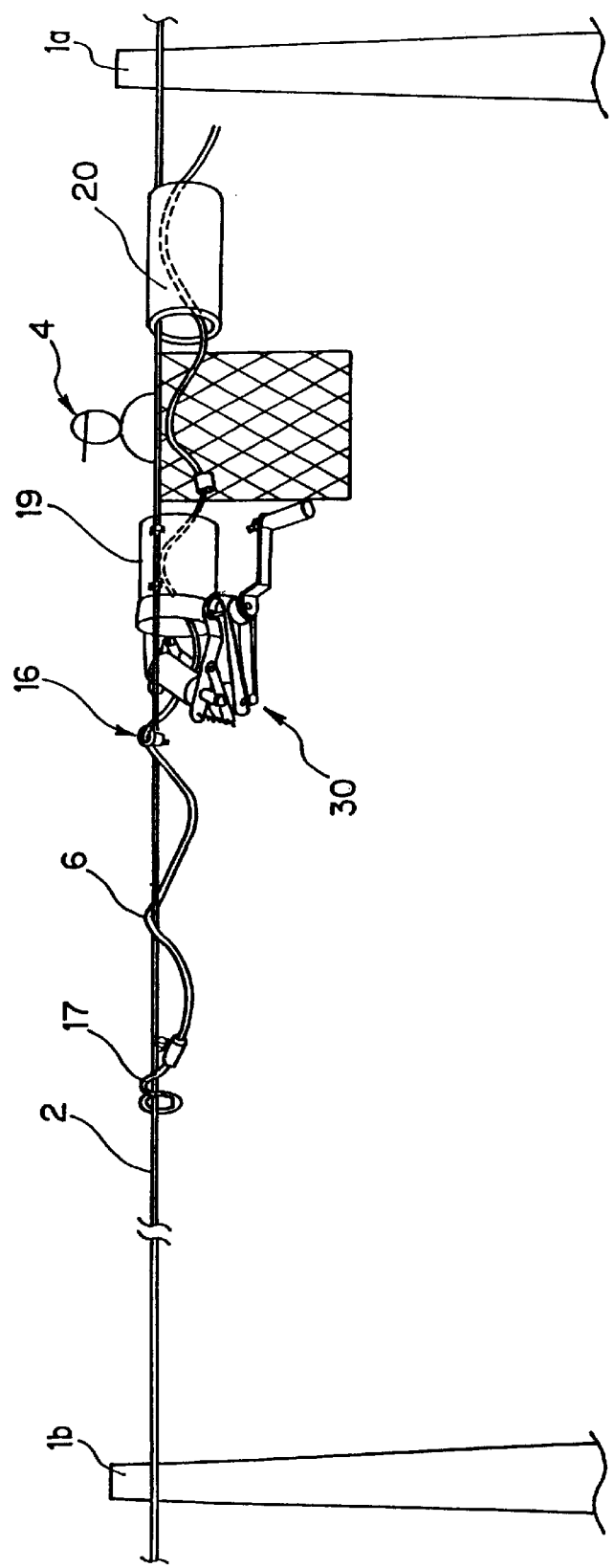
FIG. 9 is a side view showing another embodiment in which the introduction/guidance implement and a feed apparatus are used when the spiral hangers are attached to the messenger wire in accordance with the installation method of the present invention.
Figure 10:
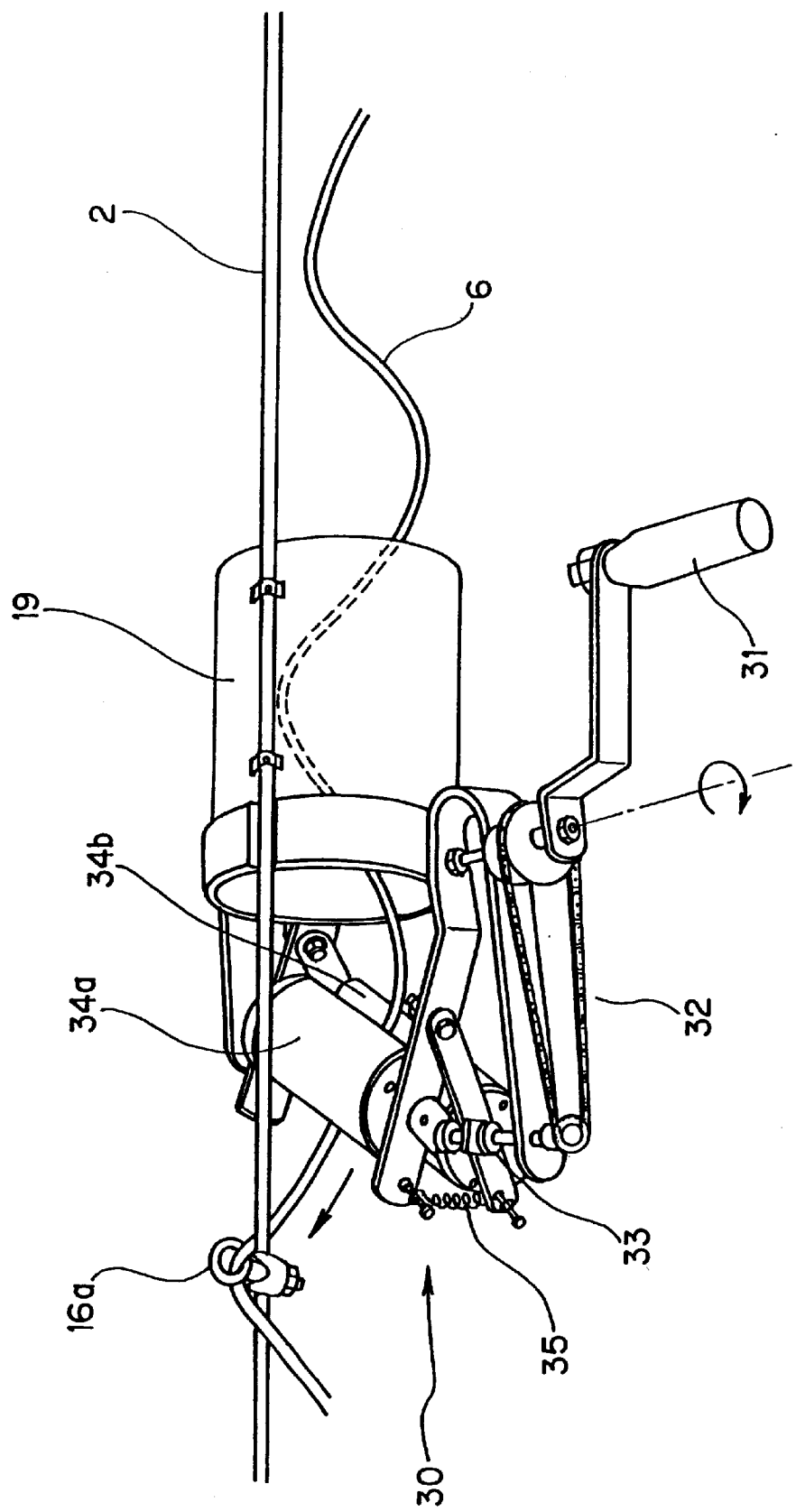
FIG. 10 is an enlarged side view showing an embodiment of a spiral hanger feed apparatus according to the present invention.
Figure 11:
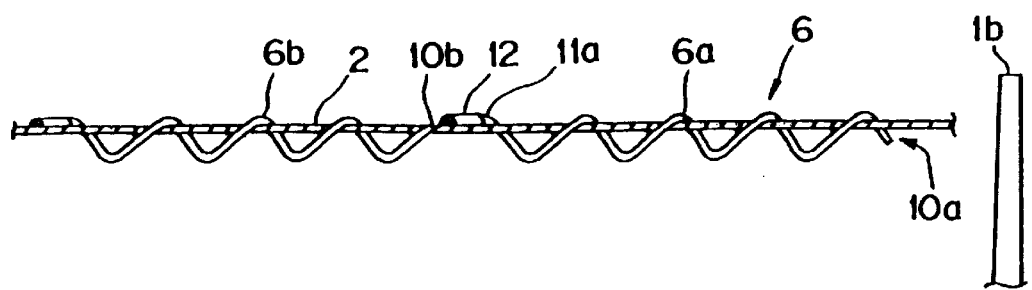
FIG. 11 is an exploded side view schematically showing the state in which the spiral hangers are coupled and connected together in the installation method of the present invention.
Figure 12:
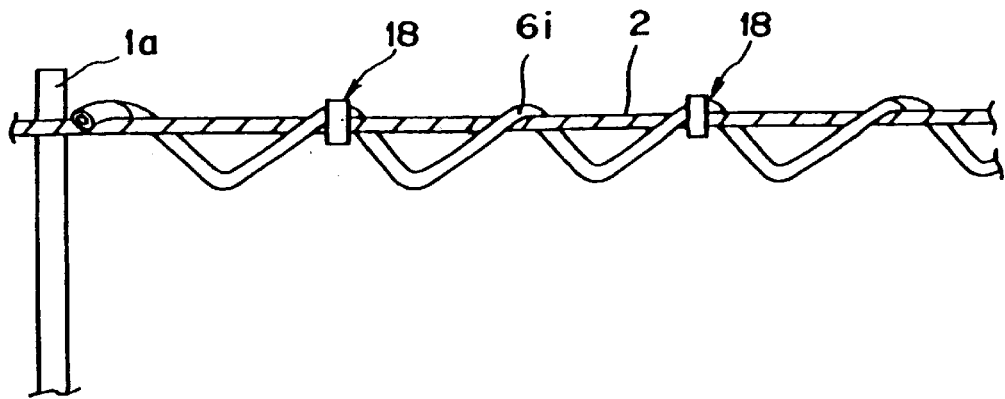
FIG. 12 is a side view schematically showing the state in which fixing devices are attached to the messenger wire in the installation method of the present invention.

Next, the installation method of the present invention will be described in more detail with reference to FIGS. 6 through 12. FIG. 6 is a perspective view of an introduction/guidance implement used in the installation method of the present invention. FIG. 7 is a front view of a falling-down-prevention coupling implement for coupling the spiral hanger with the messenger wire. FIG. 8 is a side view showing an embodiment in which the introduction/guidance implement and a feed apparatus are used when the spiral hangers are attached to the messenger wire in accordance with the installation method of the present invention. FIG. 9 is a side view of another embodiment in which installation work is performed from the right-side electric utility pole, which is reverse as compared to the case shown in FIG. 1. FIG. 10 is an enlarged side view showing an embodiment of a spiral hanger feed apparatus according to the present invention. FIG. 11 is an exploded side view schematically showing the state in which the spiral hangers are coupled and connected together in the installation method of the present invention. FIG. 12 is a side view schematically showing the state in which fixing devices are attached to the messenger wire in the installation method of the present invention.

First, the spiral hanger 6 is attached to the messenger wire 2 in the following manner. As shown in FIG. 8, an introduction/guidance implement 16 serving as a support point is attached to the messenger wire 2. As shown in FIG. 6, the introduction/guidance implement 16 has a ring portion 16a through which the spiral hangers 6 freely pass and a support portion 16b through which the introduction/guide implement 16 is supported by the messenger wire 2. The support portion 16b is composed of a base member 161 and a U-shaped member 162 that penetrates the base member 161. A threaded portion 163 is provided at one upper end portion of the U-shaped member 162. The base member 161 is detachably attached to the U-shaped member 162 by screwing a nut 164 onto the threaded portion 163. The introduction/guidance implement 16 is attached to the messenger wire 2 such that the messenger wire 2 passes through the circular space 165 between the base member 161 and the U-shaped member 162. The spiral hangers 6 are passed through the ring portion 16a.

Although the introduction/guidance implement 16 is attached at the same height as the messenger wire 2, the ring portion 16a is located somewhat lower than the messenger wire 2 and is disposed such that the spiral hanger 6 can enter the ring portion 16a smoothly at right angles even though each portion of the spiral hanger 6 slants with respect to the messenger wire 2. The tip end of the first spiral hanger spiral hanger is movably coupled with the messenger wire 2 via a falling-down-prevention implement 17 shown in FIG. 9.

As shown in FIG. 7, the falling-down-prevention implement 17 is composed of a front spiral portion 17a for coupling with the messenger wire 2 and a rear connecting portion 17b into which the spiral hanger 6 is inserted. The tip end of the spiral hanger 6 is inserted into the connecting portion 17b and the spiral portion 17a is coupled with the messenger wire 2, so that the spiral hanger 6 is prevented from falling down.

After the falling-down-prevention implement 17 is inserted into the first spiral hanger 6a and fixed thereto, the first spiral hanger 6a is transported toward the other electric utility pole 1b. The transportation is continued until the other end 11a of the first spiral hanger 6a reaches the transporting point (installation work point), as shown in FIG. 11. Since the joint sleeve 12 is attached to the other end 11a of the first spiral support 6a such that the other end 11a is received by a first half 15a of the through hole 15, the second half 15b of the through hole 15 is still empty. Subsequently, one end 10b of a second spiral hanger 6b is inserted into the second half 15b of the through hole 15, and the joint sleeve 12 is then crimped to the second spiral hanger 6b through use of the crimping tool 13 shown in FIG. 3. This connection and the above-described transportation are repeated so that the attachment of the spiral hangers 6 proceeds.

The above-described work is continued until the one end 10a of the first spiral hanger 6a reaches the other electric utility pole 1b, as shown in FIG. 11. As a result, all the spiral hangers 6a–6i (see FIG. 12) are disposed on the messenger wire 2 between the electric utility poles 1a and 1b. Subsequently, the first spiral hanger 6a and the last spiral hanger 6i are fixed to the messenger wire 2 through use of fixing devices 18 as shown in FIG. 12. Preferably, two or three fixing devices are be used to fix each of the spiral hangers 6a and 6i.

As shown in FIG. 9, at the installation work point between the electric utility poles 1a and the introduction/guidance implement 16, a cylindrical introduction guide 19 is fitted onto the messenger wire 2 with a clearance being formed the messenger wire 2 and the bottom portion of the cylindrical introduction guide 19. Moreover, on the rear side of the introduction guide 19 is attached a stock holder 20 for storing 5–10 spiral hangers (spiral hanger 6b, etc.) to be installed subsequently. The spiral hangers are taken out one by one and each is connected to the preceding one and then transported in the connected state. This allows the installation work to be carried out more easily and quickly. Although not illustrated in the drawings, a longitudinal slit is formed in each of the cylindrical introduction guide 19 and the stock holder 20, so that they can be easily attached to the messenger wire 2 for fixation thereto and removed from the messenger wire 2. FIG. 9 shows a state in which the installation work is performed from the right-side electric utility poles 1a, which is reverse as compared to the case of FIG. 1.

A feed apparatus 30 shown in FIG. 10 is conveniently used to feed the spiral hanger 6. When a handle 31 of the feed apparatus 30 is rotated in the clockwise direction, a universal joint 33 is driven via a chain 32, so that an upper pinch roller 34a, which is connected to the universal joint 33, rotates in the clockwise direction. The upper pinch roller 34a is pressed against a lower pinch roller 34b by a spring 35. Accordingly, when the handle 31 is rotated in the clockwise direction in a state in which the spiral hanger 6 is press-held or sandwiched between the pinch rollers 34a and 34b, the spiral hanger 6 can be fed.

Figure 13:
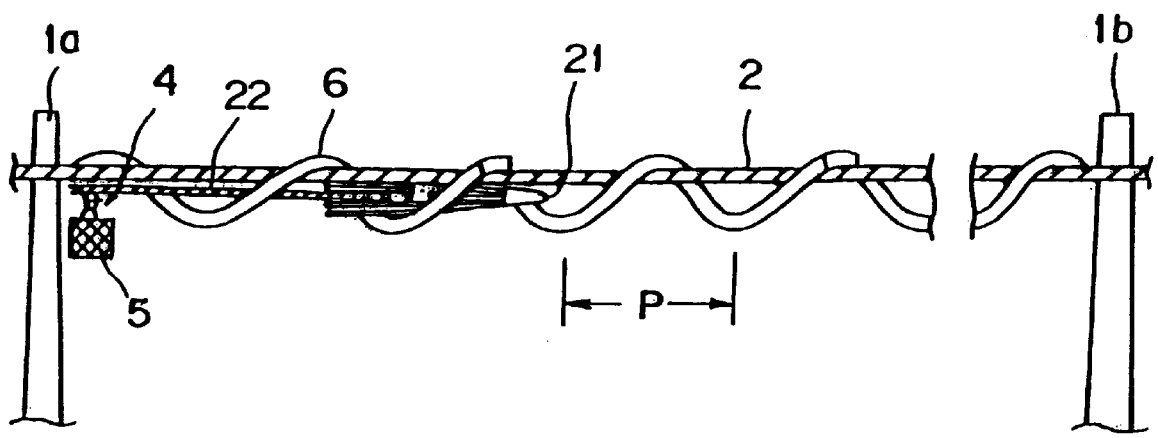
FIG. 13 is a side view schematically showing an example of installation in which a pull-rope threading implement of the present invention is used.
Figure 14:
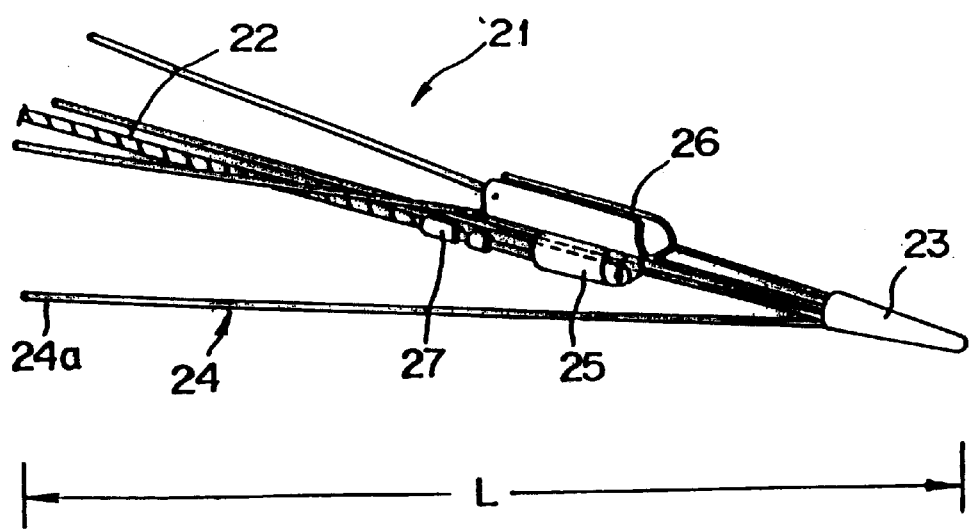
FIG. 14 is a side view showing the pull-rope threading implement of the present invention.
Figure 15:
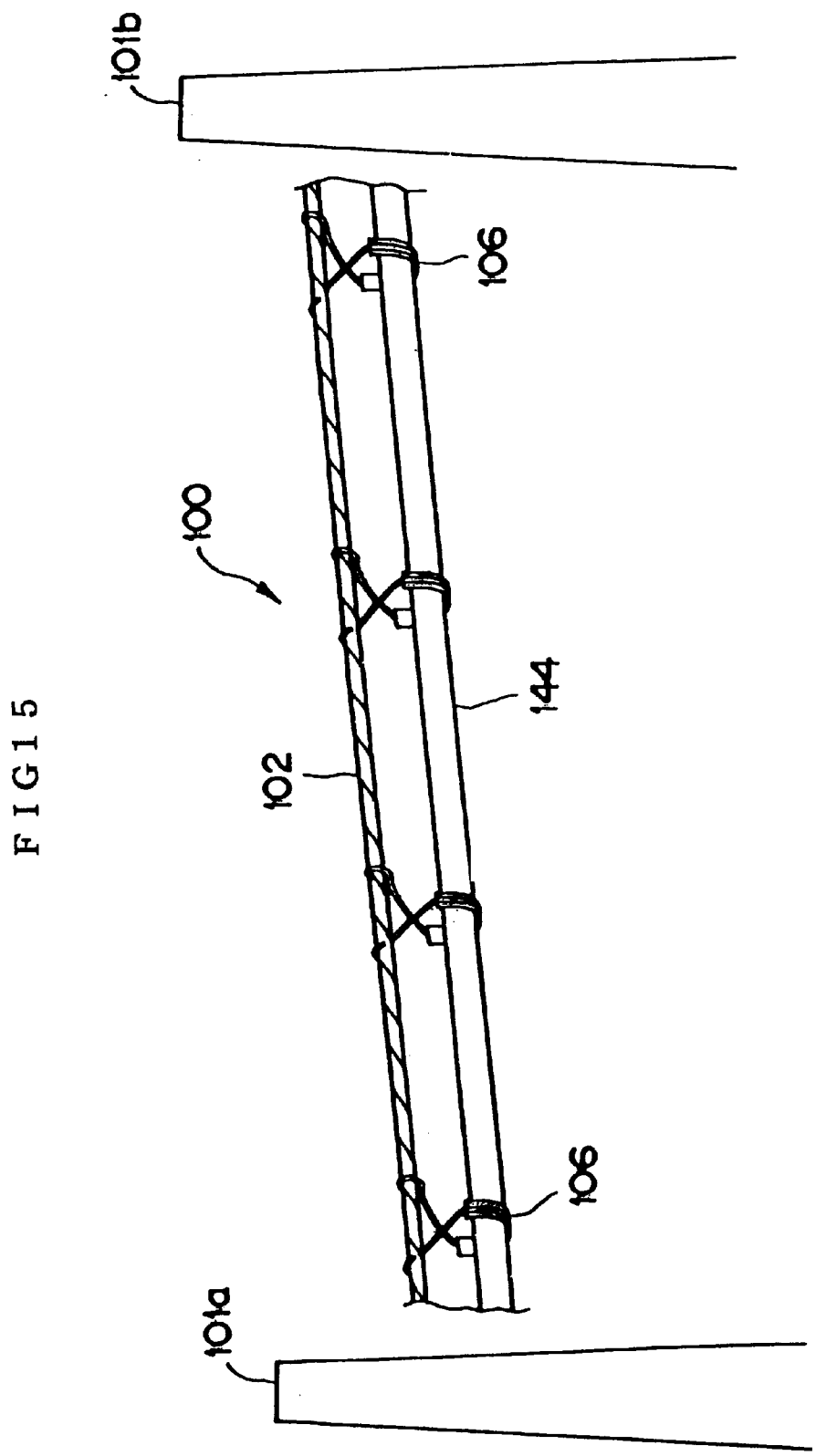
FIG. 15 is a partial side view schematically showing the state in which a cable is hung from a messenger wire by a conventional hanger system.

Next, a pull-rope threading implement of the present invention will be described with reference to FIGS. 13 and 14. FIG. 13 is a side view schematically showing an example of installation in which a pull-rope threading implement of the present invention is used. FIG. 14 is a side view showing the pull-rope threading implement of the present invention.

As shown in FIG. 13, the worker 4 in the bucket 5 disposed in the vicinity of one electric utility pole 1a uses a pull-rope threading implement 21 in order to feed a pull-rope portion 22 into the inside space of the spiral hangers 6 wound around the messenger wire 2 installed between the electric utility poles 1a and 1b.

The structure of the pull-rope threading implement 21 of the present invention will be described in detail. As shown in FIG. 14, the pull-rope threading implement 21 is composed of the pull-rope portion 22, a leading threading portion 23, and a wing portion 24. In the present embodiment, a joint portion 25 and a coupling portion 26 are further provided.

That is, in the pull-rope threading implement 21 of the present invention, the conical-shaped leading threading portion 23 is provided at the tip; the wing portion 24 made of, for example, plate springs is disposed at the rear side in an expanded state; and the pull-rope portion 22 made of a rigid material having a slight elasticity is provided at the rear side.

In the present embodiment, the pull-rope portion 22 is formed of a glass-fiber-reinforced synthetic resin (FRP) having a diameter of about 2.5 mm. The pull-rope portion 22 may be formed of a metal or a synthetic-resin-coated material, provided that it can have sufficient rigidity to maintain the necessary straightness for insertion into the spiral hangers 6, as well as a slight elasticity.

The joint portion 25 serves as a support portion for opening and closing the coupling portion 26, which has a longitudinally split structure. In the present embodiment, a sleeve 27 is attached to the joint portion 25. The sleeve 27 is made of a metal such as stainless steel, and the pull-rope portion 22 is joined to the sleeve 27. The coupling section 26 is formed of a thin metal plate. In the present embodiment, the coupling section 26 is formed of a stainless steel plate.

The pull-rope threading implement 21 has the conical leading threading portion 23 at its tip end. In the present embodiment, the leading threading portion 23 is made of metal and has a rocket-like shape. However, the shape and material of the leading threading portion 23 may be determined freely, provided that it is generally conical and has a pointed tip. As described above, the wing portion 24 including the expanded plate springs 24a is attached to the rear end of the leading threading portion 23.

Each of the plate spring 24a is composed of several bent pieces of piano wire. The pieces of piano wire are fixed to the outer periphery of the rear end of the leading threading portion 23 through silver-alloy brazing, and expand to form a rocket-like shape. In other words, the wing portion 24 is composed of a group of separated pieces of wire, like a tea stirrer. In the present embodiment, the wing portion 24 is composed of four plate springs. The joint potion 25 is disposed on the upper two plate springs to be located in the vicinity of the leading threading portion 23. However, the joint portion 25 may be provided at the back of the leading threading portion 23 in an integrated manner.

The plate springs 24a of the wing portion 24 are urged such that when the wing portion 24 is inserted into a circular space having an inner diameter smaller than the diameter of the wing portion 24 in the expanded state, the respective plate springs 24a deform and the diameter of the wing portion is reduced automatically, and when the plate springs 24a are released, the plate springs 24a return to their original shapes. When the diameter of the wing portion 24 is reduced, the outer diameter of the wing portion 24 must become sufficiently small such that the wing portion 24 can enter the spiral hanger 6. The length L of the wing portion 24 must be determined to be greater than the pitch P of the spiral hanger 6, preferably greater than double the pitch P.

In the present embodiment, the coupling portion 26 for coupling with the messenger wire 2 shown FIG. 13 is provided above the joint portion 25 in an integrated manner. The pull-rope portion 22 is provided at the rear end of the joint portion 25. However, this structure may be modified such that a hole is formed at the center of the leading threading portion 23 and the pull-rope portion 22 is inserted into the hole and is directly bonded to the leading threading portion 23.

In the present embodiment, since the coupling portion 26 has an inner diameter slightly larger than the outer diameter of the messenger wire 2, and the upper portion is split in the longitudinal direction, the coupling section 26 can be easily attached to the surface of the messenger wire 2 from the lower side thereof.

When the pull-rope threading implement having the above-described structure is inserted into the spiral hanger 6 and then pushed from the rear side, the coupling portion 26 slides smoothly along the surface of the messenger wire 2 shown in FIG. 13. Since the tip end of the leading threading portion 23 has a pointed shape, the pull-rope threading implement 21 can be advanced such that the tip end of the leading threading portion 23 plows its way through the spiral hangers 6. At this time, the outer diameter of the wing portion 24 is reduced in accordance with the inner diameter of the spiral hangers 6, and the pull-rope portion 22 is passed through the spiral hangers 6.

When the pull-rope threading implement 21 reaches the other electric utility pole 1b, a cable 28 (see FIG. 1) is connected to the rear end of the pull-rope portion 22.

Subsequently, the pull-rope portion 22 is wound by the winch 3 shown in FIG. 1, so that the cable 28 is pulled trough the spiral hangers 6. By the above-described procedures, the installation according to the method of the present invention is completed.

In the above-described embodiment, the cable 28 is connected directly to the pull-rope portion 22 of the pull-rope threading implement 21. Although not illustrated, a cable pulling rope may be connected to the pull-rope portion 22 and the cable 28 may be connected to the rear end of the cable pulling rope in order to pull the cable 28 through the spiral hangers 6. In this case, the pulling rope may be installed between the electric utility poles 1a and 1b, between the electric utility pole 1b and an unillustlated succeeding electric utility pole, etc., with both ends of each rope being Joined with the ends of adjacent ropes, with the result that the cable 28 can be installed over the longer span.

When a cable is additionally installed at a later time, the cable can be installed in the similar way. In this case, the pulling-rope threading implement 21 is inserted into the spiral hangers 6 through which the messenger wire 2 and the cable 28 have been already passed.

Obviously, numerous modifications and variations of the present invention are possible in light of the above teachings. It is therefore to be understood that within the scope of the appended claims, the present invention may be practiced otherwise than as specifically described herein.

What is claimed is:

1. An implement set used for installation of spiral hangers for hanging a cable on a messenger wire installed between a pair of electric utility poles, comprising:

an introduction/guide implement having a ring portion through which the spiral hangers freely pass and a support portion through which the introduction/guide implement is supported by the messenger wire;

a falling-down-prevention coupling implement to be attached to the forward end of the first spiral hanger and adapted to be coupled with the messenger wire;

a cylindrical introduction guide to be fit onto the messenger wire with a clearance being formed between the messenger wire and the bottom portion of the cylindrical introduction guide; and a pull-rope threading implement for passing the cable through the spiral hangers attached to the messenger wire installed between the electric utility poles.

* * * * *